United States Patent [19]

Christiansen

[11] Patent Number: 5,172,654
[45] Date of Patent: Dec. 22, 1992

[54] MICROPROCESSOR-BASED BOILER CONTROLLER

[75] Inventor: Leo P. Christiansen, Mendota Heights, Minn.

[73] Assignee: Century Controls, Inc., Edina, Minn.

[21] Appl. No.: 833,067

[22] Filed: Feb. 10, 1992

[51] Int. Cl.⁵ .................... F22B 37/42; F22D 5/00
[52] U.S. Cl. .................... 122/448.3; 60/667; 236/1 E
[58] Field of Search ............... 122/448.3; 60/667, 676; 236/1 E

[56] References Cited

U.S. PATENT DOCUMENTS

| | | | |
|---|---|---|---|
| 4,418,541 | 12/1983 | Russell | 122/448.3 X |
| 4,513,910 | 4/1985 | Bartels | |
| 4,559,785 | 12/1985 | Gaines et al. | 122/448.3 X |
| 4,598,668 | 7/1986 | Bader | |
| 4,860,696 | 8/1989 | Fujita | 122/448.3 |
| 4,864,972 | 9/1989 | Batey et al. | 122/448.3 |
| 5,042,431 | 8/1991 | Shprecher et al. | |

Primary Examiner—Edward G. Favors
Attorney, Agent, or Firm—Haugen and Nikolai

[57] ABSTRACT

A microprocessor-based sequencer for a multiple boiler heating system which allows the plural boilers to operate in a base load mode whereby one or more boilers can be made to operate at their optimum operating points and as the heating demand changes, a swing boiler accommodates the change, leaving the other(s) at their Preferred Load value until the swing boiler can no longer satisfy the demand change. At this point, the sequencer adjusts the base load level away from the preferred load set-point.

6 Claims, 2 Drawing Sheets

MICROPROCESSOR-BASED BOILER CONTROLLER

BACKGROUND OF THE INVENTION

I. Field of the Invention

This invention relates generally to automatic controls for boilers, and more particularly to a microprocessor-based sequencer capable of monitoring changes in load demand and for adjusting the firing rate of plural boilers in accordance with a base load algorithm.

II. Discussion of the Prior Art

Various systems are disclosed in the prior art for controlling the operation of multiple boilers in a coordinated fashion so that they jointly meet the load demands of a heating system or other industrial process. For example, the Bader U.S. Pat. No. 4,598,668 discloses a control system for operating any one of a plurality of parallel connected boilers as a lead boiler, with the others operating as lag boilers. The control mechanism described in the patent enables a lag boiler to assist the lead boiler during prolonged operating periods so that the load is jointly shared. This is said to extend equipment life and to improve the overall efficiency of the system. In the event of a sudden boiler failure, the failed boiler is effectively switched out of operation and then the load is adjusted between the remaining boilers.

The Bartels U.S. Pat. No. 4,513,910 describes a multi-boiler system and especially a control arrangement therefore for operating modulating motors and a fuel burner capable of operating in a low fire mode and a modulating mode. A pressure or temperature sensor provides signals proportional to the actual load being delivered which causes the boiler to be modulated to cause a boiler to operate in its low fire mode upon start-up but switching to a modulating mode when a high fire limit is reached.

The Shprecher et al. U.S. Pat. No. 5,042,431 describes a microprocessor-based sequencer for a multiple boiler heating system in which each boiler has an adjustable firing level of modulation at which it is turned on and an adjustable threshold level of modulation below which the next boiler is disabled from being turned on. Means are provided for continuously comparing the actual heating load to a system set-point whereby the total change in system output level required to produce a specified temperature within a given time period is developed. By appropriate firing and turnoff of plural boilers, the total workload can be shared. Both the Shprecher et al. patent and the Bader patent pertain to socalled parallel mode controls in which an operator selects the boilers to be run and which are brought up after a predetermined time delay to all follow the demand. The first boiler ignites and after a time delay, it follows the demand. At an adjustable point after the time delay has expired, the second boiler ignites and warms and then the first and second boiler both follow the demand. In the event of a falling demand, the boilers are shed in exactly the reverse order. While parallel operation allows multiple boilers to share a common load, it does not ensure that the system will be operating at optimum efficiency.

As those skilled in the art appreciate, the most efficient firing rate varies from boiler to boiler. A need, therefore, exists for a boiler sequencer or controller which will base load individual boilers at their most efficient firing rate. In a base load mode of operating three boilers, on original start-up, the first boiler carries the load until its firing rate reaches its programmable Add Boiler Load set-point which may, for example, be about 45 percent. At this time, the second boiler fires and is held at "low fire" for a time sufficient to alleviate damage due to thermal shock. It then follows the load in parallel with the first boiler until the second boiler reaches an Effect Base Load set point at, for example, 25 percent. The first boiler will increase in firing rate in increments along with the second boiler until the first boiler reaches its Preferred Load value. Any further changes in load demand will be satisfied by the second boiler swinging. Hence, the firing rate of the first boiler will not go higher than its Preferred Load set point until the second boiler has its firing rate equal or greater than the Advanced Base Load set point for that boiler. If the demand increases to the point where the second boiler reaches its Add Boiler set-point, the third boiler is brought on-line and will act as the modulating or swing boiler for the system. In this fashion, whenever possible, one or more boilers is allowed to operate at its preferred load at which its efficiency is a maximum. By providing an automated base load feature, considerable fuel savings over the parallel mode of boiler operation can be realized. Further, by allowing intermittent warm-up of the idle boilers, less repair and down-time are experienced.

As the firing rate requirements drop off, the lag boiler will have its firing rate lowered. The first boiler, if above its Preferred Load, will follow the lag boiler until the first boiler is at its preferred load. It then will not follow the lag boiler downward in load any further until the lag boiler reaches the Retard Base Load set-point. The first boiler will then again follow the lag boiler downward in load. The lag boiler will drop off-line when it reaches its Shed Boiler Load set-point.

SUMMARY OF THE INVENTION

In accordance with the present invention, a boiler sequencer system is provided which comprises a plurality of boilers, each having means for varying the firing rate thereof and a means for sensing the existing firing rate and providing a sense signal proportional thereto. A microprocessor-based controller having memory means for storing a plurality of set-point values for each of the plurality of boilers, including a Maximum Firing Rate value, an Effect Base Load set-point value, a Preferred Load value, an Advance Base Load value, a Retard Base Load value, an Add Boiler Load set-point and a Shed boiler Load set-point. The microprocessor-based controller further includes a means for entering the aforementioned set-point values into the memory and a program to provide a plurality of control signals, each adapted to be applied to the means for varying the firing rate of the plurality of boilers. The microprocessor-based controller is capable of computing whether the sense signals from a second of the plurality of boilers has increased by a predetermined percentage value while the sense signal from a first of the plurality of boilers remains below the Maximum Firing Rate and the Preferred Base Load set-point value for that first boiler. If that criteria is met, the microprocessor-based controller produces the control signal for the first of the plurality of boilers to increase its firing rate by a predetermined, programmed percentage.

The controller also is capable of determining whether the sense signal from the second of said plurality of boilers has decreased by a predetermined percentage value while the sense signal from the first of the plurality of boilers remains above the Preferred Load setpoint value. If this condition is found to exist, the firing rate of the first of the plurality of boilers is decreased by a predetermined percentage value.

Thus, the sequencer of the present invention strives to maintain a process variable at its specified level while each boiler operates at a preferred load or firing rate. In this way, overall system efficiency is improved.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
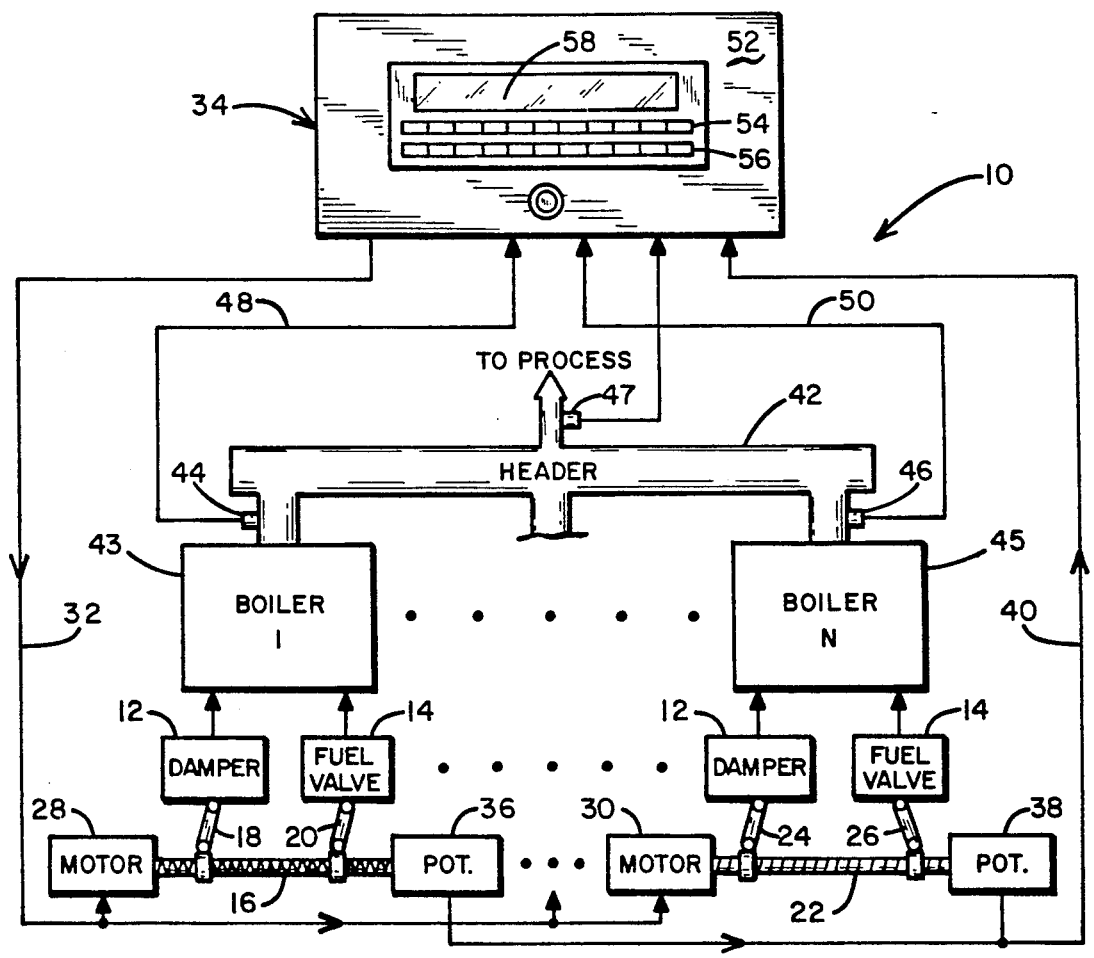
FIG. 1 is a block diagram of a multiple boiler system incorporating the microprocessor-based sequencer of the present invention.

Referring first to FIG. 1, there is indicated generally by numeral 10 a multiple boiler system incorporating a preferred embodiment of the sequence controller of the present invention. The system is seen to include a plurality of boilers including boiler 1 .. boiler N, and each has associated with it an air damper control 12 and a fuel valve 14 whereby the firing rate of each of the boilers can be independently adjusted by controlling the air/fuel ratio delivered to the burners. Associated with boiler 1 is a jack shaft 16 having linkages 18 and 20 thereon for adjusting the air and fuel delivered to the boiler #1 via damper 12 and fuel valve 14. Likewise, boiler N is shown as having a jack shaft 22 to which linkages 24 and 26 are coupled for varying the air/fuel ratio delivered to boiler N. The jack shaft 16 is adapted to be driven by a suitable servo motor 28 and, similarly, the jack shaft 22 is driven by a servo motor 30. As will be explained in greater detail hereinbelow, the control signals for motors 28 and 30 are delivered over a cable 32 from the sequencer module 34.

The instantaneous position of the several jack shafts 16 and 22 is sensed by potentiometers 36 and 3 and the sensed analog signal is fed over cable 40 to the microprocessor-based controller sequencer 34. In that the sensing potentiometers 36 and 38 are driven by their respective jack shafts, the signal developed is directly related to the positioning of the linkages 18-20 and 24-26 and therefore A/F ratio delivered to the individual boilers.

The steam or hot water output from the boilers is delivered through a header 42 to satisfy the needs of a process which may, for example, be a heating requirement for a building or a pressure for operating a steam-driven machine of one type or another. Associated with each of the boilers 1 through N is a sensor, as at 44 and 46, capable of developing an analog electrical signal on the lines 48 and 50 leading to the sequencer 34, the analog signal being proportional to the instantaneous output from its associated boiler. In this regard, the sensors 44 and 46 may be either a temperature sensor or a pressure sensor. These individual sensors 44 and 46 provide "ready" status at a predetermined warm-up setting that will hold the individual boiler temperatures or pressures at certain minimum levels to prevent thermal shock and accompanying premature failure. A further sensor 47 is provided for sensing the process variable or total load state.

The sequencer 34 includes a front panel 52 on which is mounted a plurality of manually-operable keys which are disposed in rows 54 and 56. These keys permit an operator to enter information into the microprocessor associated with the sequencer 34. Also visible on the front panel 52 is a display screen 58 on which alpha/numeric information may be presented for assisting the operator in initially programming the system and in monitoring the operating state of various variables which may be called up by using the keys in the rows 54 and 56. The display 58 is preferably a vacuum fluorescent display device, although alternative display screen types may be used as well.

Figure 2:
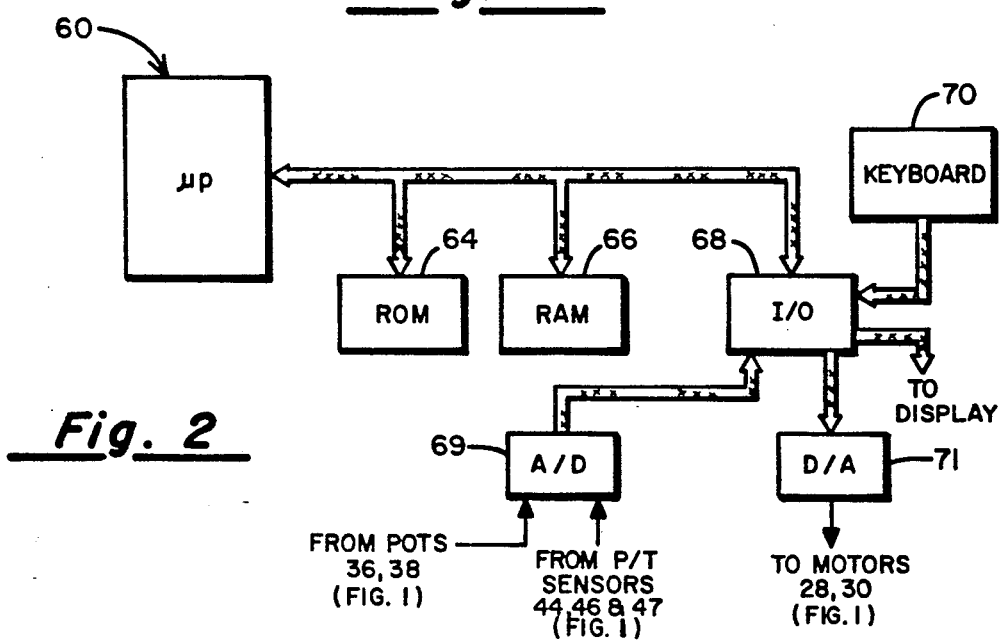
FIG. 2 is a logical block diagram of the sequencer portion of the system shown in FIG. 1.

Referring next to FIG. 2, the heart of the sequencer 34 is a microprocessor 60 which may be a TI 9995 available through the Texas Instruments Company of Dallas, Tex. It has coupled to it by way of an internal bus 62 a ROM memory 64 for storing predetermined constants used in executing the software, a RAM memory 66 for storing various initial set-point values and temporary operands developed during the computations by the microprocessor during execution of the software routines.

Also coupled to the system bus 62 is a I/0 interface 68. The I/0 interface receives digital inputs from the A/D converter 69 coupled to the load sensing potentiometers 36 and 38 and the pressure/temperature sensing devices 44, 46 and 47. Digital outputs from the I/0 interface 68 are converted to analog form in D/A converter 71 and applied to the servo motors 28, 30 via conductors in cable 32. The keys in the rows 54 and 56 on the front panel 52 of the sequencer are identified as keyboard 70 in FIG. 2 which feeds into the I/0 interface 68, permitting data entries to be made into the RAM 66 under control of the microprocessor 60.

Having described the general configuration of the hardware components of the system of the present invention, consideration will next be given to the functioning of the system to allow base load control of plural boilers.

The data entry keys in rows 54 and 56 and the display 58 enable the operator to enter new set-points and to read out process variable set-points and various other parameters. The keyboard is used to enter all set-points and alarm-points after the proper security access code has been entered. An "ENTER" key is used to cause the microprocessor to enter into its RAM memory 66 the set-point data then being displayed on the screen 58. The ENTER key is also used to scroll ahead to observe previously entered set-points only. To store a set-point value into the RAM, the operator first scrolls the display to the particular parameter whose set-point is to be changed and new numeric value is typed in on the keypad. The existing set-point which also appears on the display changes when the operator pushes the "ENTER" key. The new-set-point value has now been stored and the system will be operated using that new value.

The operator can also use the key in the row 54 labeled "DELETE" to back up to previous set-points or to delete the last character of a new set-point keyed in, should that character be selected in error.

At the time of installation of the sequencer of the present invention, various set-points are entered into the RAM memory 66 based upon experience or knowledge of the boiler system performance under manual control. For example, each boiler is identified to the microprocessor by a different number or letter. The "Maximum Firing Rate" of each of the identified boilers is stored as a parameter as is the "Preferred Load" value for that boiler. The Preferred Load value is the firing rate at which a particular boiler operates at its highest efficiency. Another set-point entered into the memory of the microprocessor at the time of set-up is the value at which a boiler operating at its Preferred Load will be called upon to advance its firing rate when the swing boiler reaches a predetermined set point called Advance Base Load. There is a corresponding "Retard Base Load" set-point which is the point at which a first boiler operating at its preferred load will have its firing rate decreased when the swing boiler has its firing rate decreased below that set-point.

Figure 3:
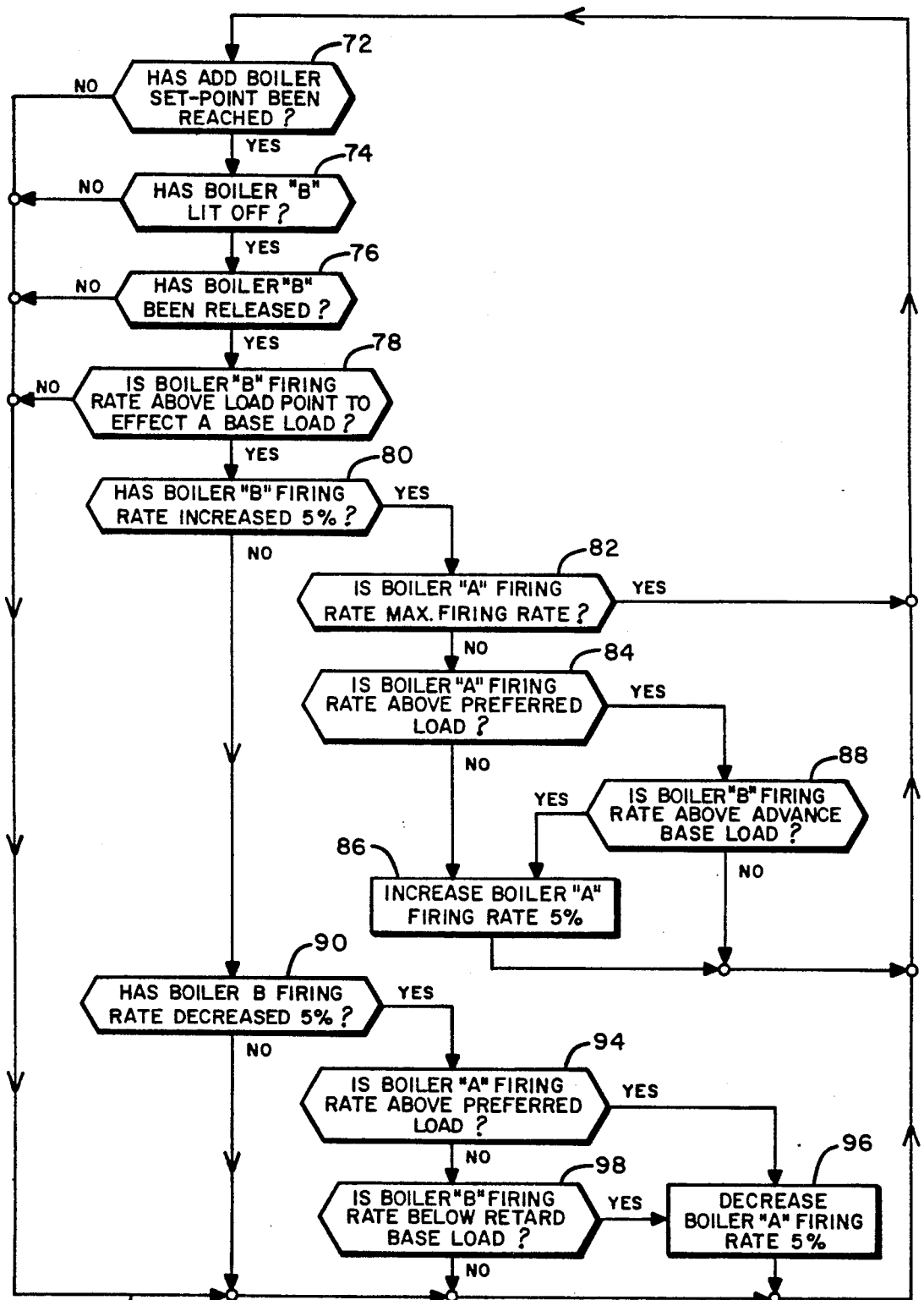
FIG. 3 is a flow diagram of the software used to run the base load mode of the sequencer.

With reference now to FIG. 3, an explanation will be given of the algorithm incorporated in the microprocessor-based sequencer whereby base loading of multiple boilers is achieved. Those skilled in programming a typical microprocessor such as the Ti 9995 are in a position to write the detail code from what is presented in the flow diagram of FIG. 3 and from the following explanation of it given herein.

On original start-up, a first boiler, referred to in FIG. 3 as boiler A, carries the load until the firing rate of that boiler reaches its Add Boiler set point, e.g., 45 percent of its rated maximum firing rate. At this time, a second boiler (boiler B) fires and goes through an adjustable warm-up period until it is released. As boiler B comes up, the point is reached where it exceeds the load point to have boiler A effect a base load operation. Boiler A and boiler B move up in increments in parallel and Boiler A locks in at a predetermined firing rate where it exhibits its highest efficiency, i.e., its Preferred Base Load. Boiler A's firing rate will remain at the programmed Preferred Base Load until the swing boiler (boiler B) reaches a preset high point called Advance Base Load, at which time the base load for boiler A will increase along with boiler B, the swing boiler. Boiler A will return to its programmed Preferred Base Load when the swing boiler (boiler B) drops back in firing rate. Likewise, boiler A will hold its base load at the preprogrammed preferred level stored in RAM memory 66 until the second boiler drops to an adjustable low point referred to as the "Retard Base Load" set-point at which time boiler A will be caused to drop from its Preferred Base Load value. Boiler A will return to its Preferred Base Load as the system demand again increases.

Having generally explained the base load mode of operation of plural boilers, the flow diagram of FIG. 3 will be more readily understood. The sequence identified in FIG. 3 is continuously monitored and a series of tests are made to determine first whether the load demand is such that the Add Boiler set-point is reached (block 72), then whether boiler B ignition has been proven (block 74) and it has been allowed to warm up for a predetermined time or until a predetermined boiler temperature is reached at which point it is released (block 76). A test is next made at block 78 to determine whether boiler B has its firing rate up to the point where boiler A is to base load. Assuming that it has, a test is next made at block 80 to determine whether the firing rate for the swing boiler (boiler B) has increased a predetermined amount, e.g., five percent, within the preceding time interval. If it has, the microprocessor samples the potentiometer 36 of boiler A to determine whether it is operating at its maximum firing rate (block 82). If it is already operating at its maximum firing rate, no further adjustment will be made to the firing rate of boiler A and control returns to the input of block 72. If the firing rate of boiler A is found not to be at its Maximum Firing Rate, a test is made at block 84 to determine whether the firing rate of boiler A is above the preprogrammed Preferred Base Load set-point. If it is not, the jack shaft motor 28 or 30 is energized to nudge the firing rate of boiler A up a small increment such as, for example, five percent (block 86). The firing rate for boiler A will also be nudged upward if the test at decision block 84 establishes that boiler A is above its Preferred Load and, at the same time, boiler B's firing rate is above the programmed "Advance Base Load" set-point for boiler A. See decision block 88. If the firing rate for boiler B is not above the Advance Base Load set-point, control again returns to decision block 72 where the previously described series of tests are repeated to determine whether the swing boiler firing rate has again increased five percent (block 80).

If the test at block 80 reveals that the swing boiler (boiler B) has not had its firing rate increased by a predetermined percentage, a test is made at block 90 to determine whether the firing rate of the swing boiler has decreased a predetermined percentage. If not, control returns via path 92 to the input of decision block 72. If the test at decision block 90 indicates that the swing boiler has had its firing rate decreased by the predetermined percentage, e.g., five percent, a further test is made at block 94 to determine whether boiler A is above its Preferred Base Load set-point. If it is, the motor 28 or 30 associated with the jack shaft for boiler A drives that jack shaft in a direction to decrease the firing rate of boiler A by an incremental amount, e.g., five percent (block 96), and control again reverts to the input of decision block 72. Had the test at decision block 94 revealed that the firing rate for boiler A was at a value below its preferred load set-point, then a further test is made at block 98 to determine whether the swing boiler (boiler B) is operating at a firing rate which is below the Retard Base Load set-point for boiler A. If so, the firing rate for boiler A is decreased from its Preferred Load value (block 96).

It should also be appreciated that the base load sequencing afforded by the apparatus of the present invention can be used with a system incorporating more than two boilers. For example, in a three boiler arrangement, the base load algorithm operates substantially the same as has been explained except when the second swing boiler reaches an adjustable level, the third boiler comes on and after a warm-up delay, the third boiler works upward in firing rate in the same way as in a two boiler system. At an adjustable set-point, boiler no. 2 will also be placed at its Preferred Base Load where it locks in and the third boiler swings to accommodate limited changes in system demand. The plural base loaded boilers will stay at their respective Preferred Base Load points as long as permitted, but will change as needed to take care of extreme changes in demand as established by the Advance Base Load and Retard Base Load set point values programmed into the microprocessor's memory.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A boiler sequencer system comprising:
   a plurality of boilers, each having means for varying the firing rate thereof and means for sensing the existing firing rate and providing a sense signal proportional thereto;
   (b) a microprocessor-based controller having memory means for storing a plurality of set-point values for each of said plurality of boilers, including a Preferred Load value, an Advance Base Load value and a Retard Base Load value; means for entering said plurality of set-point values into said memory means, said microprocessor-based controller producing a plurality of control signals, each applied to said means for varying the firing rate of said plurality of boilers; and
   (c) means including microprocessor-based controller for determining whether said sense signal from a second of said plurality of boilers has increased by a predetermined percentage value while said sense signal from a first of said plurality of boilers remains below said Preferred Load set-point values for that first boiler and, if so, producing said control signal for said first of said plurality of boilers to increase the firing rate of said first of said plurality of boilers by a predetermined percentage value.

2. The boiler sequencer system as in Claim 1 wherein said memory means further stores a Maximum Firing Rate set-point value and said microprocessor-based controller determines whether said sense signal from said second of said plurality of boilers has increased by a predetermined percentage value while said sense signal from said first of said plurality of boilers remains below both said Maximum Firing Rate set-point value and said Preferred Load set-point value for said first boiler and, if so, producing said control signal for said first of said plurality of boilers to increase the firing rate of said first of said plurality of boilers by said predetermined percentage value.

3. A boiler sequencer system comprising:
   (a) a plurality of boilers, each having means for varying the firing rate thereof and means for sensing the existing firing rate and providing a sense signal proportional thereto;
   (b) a microprocessor-based controller having memory means for storing a plurality of set-point values for each of said plurality of boilers, including a Maximum Firing Rate value, a Preferred Load value, an Advance Base Load value and a Retard Base Load value; means for entering said plurality of set-point values into said memory means, said microprocessor-based controller producing a plurality of control signals, each applied to said means for varying the firing rate of said plurality of boilers; and
   (c) means including microprocessor-based controller for determining whether said sense signal from a second of said plurality of boilers has increased by a predetermined percentage value while said sense signal from a first of said plurality of boilers remains below said Maximum Firing Rate set-point value and above said Preferred Load set-point value while said sense signal from said second boiler remains above said Advance Base Load setpoint value for said second boiler and, if so, producing said control signal for said first of said plurality of boilers to increase the firing rate of said first of said plurality of boilers by a predetermined percentage.

4. A boiler sequencer system comprising:
   (a) a plurality of boilers, each having means for varying the firing rate thereof and means for sensing the existing firing rate and providing a sense signal proportional thereto;
   (b) a microprocessor-based controller having memory means for storing a plurality of set-point values for each of said plurality of boilers, including a Maximum Firing Rate value, a Preferred Load value, an Advance Base Load value and a Retard Base Load value; means for entering said plurality of set-point values into said memory means, said microprocessor-based controller producing a plurality of control signals, each applied to said means for varying the firing rate of said plurality of boilers; and
   (c) means including microprocessor-based controller for determining whether said sense signal from a second of said plurality of boilers has decreased by a predetermined percentage value while said sense signal from a first of said plurality of boilers remains above said Preferred Load set-point value and, if so, decreasing said firing rate of said first of said plurality of boilers by a predetermined percentage value.

5. A boiler sequencer system comprising:
   (a) a plurality of boilers, each having means for varying the firing rate thereof and means for sensing the existing firing rate and providing a sense signal proportional thereto;
   (b) a microprocessor-based controller having memory means for storing a plurality of set-point values for each of said plurality of boilers, including a Maximum Firing Rate value, a Preferred Load value, an Advance Base Load value and a Retard Base Load value; means for entering said plurality of set-point values into said memory means, said microprocessor-based controller producing a plurality of control signals, each applied to said means for varying the firing rate of said plurality of boilers; and
   (c) means including microprocessor-based controller for determining whether said sense signal from a second of said plurality of boilers has decreased by a predetermined percentage value and is less than said Retard Base Load set-point value and said sense signal from a first of said plurality of boilers is below said Preferred Load set-point value and, if so, decreasing said firing rate of said first of said plurality of boilers by a predetermined percentage value.

6. A method of controlling a plurality of boilers each having means for varying the firing rate thereof to meet process variable requirements and means for sensing the existing firing rate and providing a sense signal proportional thereto, comprising the steps of:

(a) storing in the memory of a microprocessor-based controller a plurality of set-point values for each of said plurality of boilers including an Add Boiler set-point value, an Advance Base Load set-point value, a Retard Base Load set-point value, and a Preferred Base Load set-point value;

(b) firing off a first boiler;

(c) increasing the firing rate of said first boiler until said Add Boiler set-point value is reached;

(d) firing off said second boiler when said first boiler's firing rate reaches its Add Boiler set-point value;

(e) increasing the firing rate of both said first and second boilers until said second boiler's Effect Base Load set point value is reached;

(f) allowing the firing rate of said first boiler to reach said Preferred Base Load set-point value for that boiler;

(g) holding the firing rate of said first boiler at its said Preferred Base Load set-point value as said second boiler swings to accommodate changes in said process variable; and (h) allowing the firing rate of said first boiler to again increase only when said Advance Base Load set-point value is reached.

* * * * *